(12) United States Patent
Sundaram et al.

(10) Patent No.: US 9,043,530 B1
(45) Date of Patent: May 26, 2015

(54) DATA STORAGE WITHIN HYBRID STORAGE AGGREGATE

(75) Inventors: Rajesh Sundaram, Mountain View, CA (US); Douglas Paul Doucette, San Diego, CA (US); David Grunwald, San Francisco, CA (US); Jeffrey S. Kimmel, Chapel Hill, NC (US); Ashish Prakash, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 337 days.

(21) Appl. No.: 13/442,194

(22) Filed: Apr. 9, 2012

(51) Int. Cl.
*G06F 12/00* (2006.01)
*G06F 3/06* (2006.01)
*G06F 12/08* (2006.01)

(52) U.S. Cl.
CPC ............. *G06F 3/0685* (2013.01); *G06F 3/068* (2013.01); *G06F 12/0802* (2013.01); *G06F 2212/217* (2013.01)

(58) Field of Classification Search
None
See application file for complete search history.

(56) References Cited

U.S. PATENT DOCUMENTS

| 8,751,725 | B1 * | 6/2014 | Gangadharan et al. ....... 711/100 |
| 2010/0281230 | A1 | 11/2010 | Rabii et al. |
| 2012/0072652 | A1 * | 3/2012 | Celis et al. ..................... 711/103 |

* cited by examiner

*Primary Examiner* — Midys Rojas
(74) *Attorney, Agent, or Firm* — Cooper Legal Group, LLC

(57) ABSTRACT

Among other things, one or more techniques and/or systems are provided for storing data within a hybrid storage aggregate comprising a lower-latency storage tier and a higher-latency storage tier. In particular, frequently accessed data, randomly accessed data, and/or short lived data may be stored (e.g., read caching and/or write caching) within the lower-latency storage tier. Infrequently accessed data and/or sequentially accessed data may be stored within the higher-latency storage tier. Because the hybrid storage aggregate may comprise a single logical container derived from the higher-latency storage tier and the lower-latency storage tier, additional storage and/or file system functionality may be implemented across the storage tiers. For example, deduplication functionality, caching functionality, backup/restore functionality, and/or other functionality may be provided through a single file system (or other type of arrangement) and/or a cache map implemented within the hybrid storage aggregate.

23 Claims, 13 Drawing Sheets

DATA STORAGE WITHIN HYBRID STORAGE AGGREGATE

FIELD

The instant disclosure pertains to storing data within a hybrid storage aggregate comprising a lower-latency storage tier and a higher latency storage tier.

BACKGROUND

A storage server may comprise a computer configured to provide storage functionality relating to organization and accessibility of data stored on storage devices, such as non-volatile storage media. The storage server may be configured to operate according to a client/server model to enable clients to access data through the storage server.

A storage server may store data on various types of non-volatile storage media, such as relatively high latency (e.g., longer access times) hard disk drives (HDDs) and relatively low latency (e.g., shorter access times) solid state devices (SSDs). Latency (e.g., access time) generally corresponds to a period of time needed to retrieve data from a storage device. HDD access time may be a function of disk spin-up time, seek time, rotational delay, and/or data transfer time. Spin-up time may be a time needed to accelerate a disk to operating speed. Seek time may be a time for an access arm of the disk to reach a desired disk track. Rotational delay may be a delay for rotation of the disk to bring a desired disk sector under a read-write mechanism, which may be dependent upon rotational speed of the disk. Data transfer time may be a time during which data is read from and/or written to the storage media.

HDDs may store data on rapidly rotating platters with magnetic surfaces (e.g., an HDD may comprise magnetic storage media). Because HDDs may access data mechanically, access times of HDDs may be relatively slow due to mechanical delays (e.g., owing to disk spin-up time, seek time, rotational delay, and/or data transfer time). SSDs may utilize solid state memory, such as non-volatile flash memory, to store persistent data (e.g., an SSD may comprise electronic storage media). Because SSDs may access data with little to no mechanical movement, access times of SSDs may be relatively fast (e.g., low latency). SSDs may also provide a relatively high I/O operations per second (IOPS) capacity compared with HDDs. Unfortunately, SSD storage media may be more expensive than HDD storage media, and may have a shorter operational lifetime due to wear and other degradation.

SUMMARY

The disclosure relates to, among other things, one or more techniques and/or systems that store data within a hybrid storage aggregate comprising a lower-latency storage tier and a higher-latency storage tier. In one example, the lower-latency storage tier may comprise electronic storage media, such as one or more solid state devices, and the higher-latency storage tier may comprise magnetic storage media, such as one or more hard disk drives. In one example, the lower-latency storage tier may be maintained as a persistent cache used to store frequently accessed (e.g., "hot") data, randomly accessed data, data predicted to become hot, data that is designated for low latency access (e.g., metadata, a service level objective (SLO), etc.), and/or data that may be short lived in memory. The higher-latency storage tier may be used to store infrequently accessed (e.g., "cold") data, sequentially accessed data, and/or data that may be stored long term in memory. It may be appreciated that one or more examples of the hybrid storage aggregate are illustrated in FIG. 5 as a hybrid storage aggregate 504 and/or in FIG. 6 as a hybrid storage aggregate 602.

The hybrid storage aggregate may comprise a logical aggregate of storage devices within the storage tiers (e.g., a single logical container for a pool of storage combining one or more of the storage devices or parts thereof into a single logical storage container), which may provide storage for one or more logical datasets at a higher level of abstraction, such as a volume. In one example, the hybrid storage aggregate may be owned by or comprised within a single storage server at any given time. Various storage management operations may be performed upon the hybrid storage aggregate. In one example, the hybrid storage aggregate may be migrated from a first storage server to a second storage server (e.g., as a single logical container). In another example, if the first storage server fails, then a surviving storage server may assume ownership of the hybrid storage aggregate. In another example, the hybrid storage aggregate may comprise RAID protected storage devices, which may mitigate single points of failure (e.g., redundancy may be provided through RAID). In another example, a volume of data may be stored within at least some of the lower-latency storage tier and within at least some of the higher-latency storage tier. In other examples, migration, caching mechanisms, deduplication functionality, backup/restore functionality, and/or integration of multiple RAID groups of different storage types (e.g., an SSD RAID group may be non-disruptively added to an HDD RAID group) may be implemented across the lower-latency storage tier and the higher-latency storage tier. It may be appreciated that the higher-latency storage tier may comprise one or more RAID groups and/or the lower-latency storage tier may comprise one or more RAID groups. Such RAID groups may comprise similar or different configurations. For example, a storage tier may comprise a first RAID group with a first data parity and a first RAID type, and a second RAID group with a second data parity and a second RAID type, where the first and second data parity may be the same or different and/or the first and second RAID type may be the same or different. Thus, RAID groups may differ within the same storage tier. Similarly, RAID groups may likewise differ among different storage tiers.

In one example of storing data within the hybrid storage aggregate, an I/O operation associated with the hybrid storage aggregate may be received. The I/O operation may be evaluated to determine that the I/O operation comprises a non-sequential read operation for requested data within the higher-latency storage tier, an I/O operation designated for low latency access (e.g., metadata, a service level object (SLO), etc.), and/or comprises a read operation for requested data predicted for frequent access. For example, the I/O operation may be determined as comprising the non-sequential read operation based upon determining that the requested data is to be accessed non-sequentially (e.g., the requested data is stored within non-sequential block offsets within a data volume) and/or determining that the requested data is accessed above a threshold frequency (e.g., a non-sequential hot read operation). It may be appreciated that the threshold frequency may correspond to one or more accesses (e.g., an initial access, a threshold number of accesses within a predefined time span, more than one access within a predefined time span, etc.) The requested data may be retrieved from the higher-latency storage tier and the I/O operation may be satisfied using the requested data retrieved from the higher-latency storage tier. In one example, the requested data may be stored within a buffer cache (e.g., so that the requested data may be copied to the lower-latency storage tier without having to access the higher-latency storage tier). A copy of the requested data may be stored (e.g., persistently cached) as copied data within the lower-latency storage tier based upon the determination that the I/O operation comprises the non-sequential read operation (e.g., the requested data within the cache buffer may be stored within the lower-latency storage tier as the copied data). It may be appreciated that in one example, the requested data may be maintained within the higher-latency storage tier, and that merely a copy of the requested data may be stored within the lower-latency storage tier (e.g., the lower-latency storage tier may be implemented as a persistent cache, while the higher-latency storage tier may be implemented as long term storage). It may be appreciated that various caching techniques may be employed to manage data within the lower-latency storage tier (e.g., an aging technique used to evict data that becomes "cold" due to infrequent access).

A cache map may be implemented within the hybrid storage aggregate (e.g., the cache map may be integrated into a file system of the hybrid storage aggregate, and thus available to various storage functionality and/or APIs, such as deduplication, caching, and/or backup/storage functionality). It may be appreciated that one example of a cache map is illustrated in FIG. 11 as cache map 1102. The cache map may comprise entries associated with copied data that were copied from the higher-latency storage tier to the lower-latency storage tier (e.g., copied data that was read cached by a read caching component). In this way, the cache map may be queried to determine information about copied data stored within the lower-latency storage tier from the higher-latency storage tier, such as determining whether a read block has been cached within an SSD storage device. For example, an entry may be made within the cache map indicating that the requested data was copied from the higher-latency storage tier to the lower-latency storage tier as the copied data.

Because it may be advantageous to store frequently accessed (e.g., "hot") data within the lower-latency storage tier (e.g., due to relatively fast access times and/or high I/O operations per second capability), and store infrequently accessed (e.g., "cold") data within the higher-latency storage tier (e.g., due to relatively cheaper storage costs), copied data stored within the lower-latency storage tier may be evicted from the lower-latency storage tier upon becoming "cold". In one example, a temperature metric may be maintained for the copied data. The temperature metric may be indicative of a frequency at which the copied data is accessed (e.g., a number of I/O accesses to the copied data over a particular time span). In one example, the temperature metric may be implemented through a data structure, such as a temperature and type (TT) map. The TT map may be consulted to determine what type of a data block is read cached, write cached, etc. If the temperature metric falls below a threshold, then the copied data may be evicted from the lower-latency storage tier. Because the higher-latency storage tier may comprise the original requested data (e.g., which may be determined based upon querying the cache map for an entry corresponding to the copied data), the copied data may be merely removed from the lower-latency storage tier (e.g., without migrating the copied data back to the higher-latency storage tier). Because the copied data may not be available within the lower-latency storage tier after removal, the entry associated with the copied data (in the lower-latency storage tier) may be removed from the cache map. In one example, a data structure, such as a reverse map, may be used to locate the entry in the cache map. The reverse map may map SSD locations to HDD locations, for example.

In another example of storing data within the hybrid storage aggregate, a second I/O operation associated with hybrid storage aggregate may be received. The second I/O operation may be evaluated to determine that the second I/O operation comprises a non-sequential write operation of writeable data. In one example, the second I/O operation may be determined as comprising a non-sequential write operation based upon determining that the writeable data is to be written to non-sequential locations (e.g., the writeable data is to be written to non-sequential block offsets within a data volume). In another example, a prediction may be made that the writeable data will be short lived in memory (e.g., the writeable data may be suitable for short term caching). The writeable data may be stored within the lower-latency storage tier based upon the determination that the second I/O operation comprises a non-sequential write operation, based upon identifying the I/O operation as being designated for low latency access (e.g., metadata, service level object (SLO), etc.) and/or based upon the prediction that the writeable data will be short lived in memory. In one example, the writeable data may not be stored within the higher-latency storage tier in order to reduce access to the higher-latency storage tier (e.g., the I/O operation may be an initial write of the writeable data, and it may be efficient to merely store the writeable data within the lower-latency storage tier if the writeable data is to be short lived in memory). Because a copy of the writeable data may not exist within the higher-latency storage tier, a cache map entry may not be made. A temperature metric may be maintained for the writeable data. If the temperature metric falls below a threshold, then the writeable data may be evicted from the lower-latency storage tier. For example, the evicting may comprise migrating the writeable data from the lower-latency storage tier to the higher-latency storage tier because a copy of the writeable data may not already exist within the higher-latency storage tier (e.g., the writeable data may be removed from the lower-latency storage tier, and a migrated copy of the writeable data may be stored within the higher-latency storage tier).

It may be appreciated that in one example, one or more of the techniques described herein may be implemented within the context of the hybrid storage aggregate (e.g., a single logical container comprising an aggregation of a lower-latency storage tier, such as a solid state drive, and a higher-latency storage tier, such as a hard disk drive). For example, a caching technique that utilizes the lower-latency storage tier as a persistent cache for the higher-latency storage tier may be implemented within the hybrid storage aggregate. Unlike conventional storage techniques that may treat the lower-latency storage tier and the higher-latency storage tier as separate storage entities, the hybrid storage aggregate may allow storage operations to be performed upon the hybrid storage aggregate as a single storage entity (e.g., a migration operation may migrate the hybrid storage aggregate as a single storage entity from a first storage server to a second storage server; a storage server failover system may treat the hybrid storage aggregate as a single storage entity so that the hybrid storage aggregate may be reassigned to a surviving storage server upon a failure; a file system consistency checking operation may evaluate the hybrid storage aggregate as a single storage entity; and/or other various systems/functionality may treat the hybrid storage aggregate as a single logical container, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
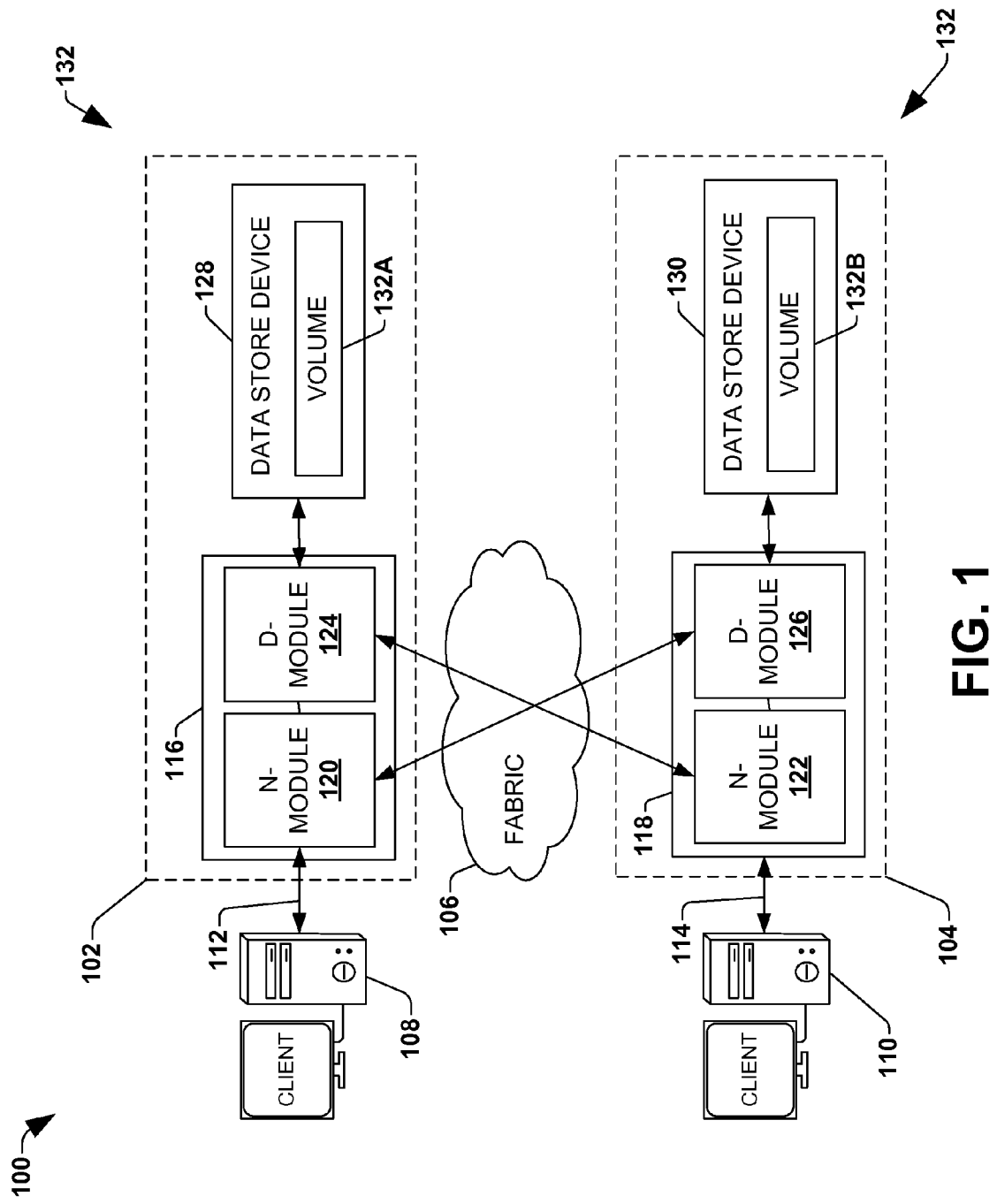
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

A storage server (e.g., a node of a data storage system within a clustered network environment) may be configured to provide data storage and management services. The storage server may provide clients with access to data stored within storage devices. In particular, the storage server may store data within a hybrid storage aggregate. The hybrid storage aggregate may comprise a logical aggregation of physical storage (e.g., a logical container for a pool of storage combining one or more physical storage devices or parts thereof into a single logical storage container). Because the hybrid storage aggregate may be configured as a single logical storage container, a file system (e.g., or other type of arrangement) may be implemented within the hybrid storage aggregate. The file system may comprise a structured set of stored files, directories, and/or other data containers (e.g., the storage server may store user data within the file system).

The hybrid storage aggregate may comprise multiple tiers of storage devices. For example, the hybrid storage aggregate may comprise a lower-latency storage tier (e.g., one or more solid state storage devices, such as a flash storage device), a higher-latency storage tier (e.g., one or more non-solid state storage devices, such as a hard disk drive), and/or other storage tiers. The lower-latency storage tier may be utilized to store data that is frequently accessed, data that is randomly accessed, and/or short lived data (e.g., the lower-latency storage tier may be utilized as a persistent cache). The higher-latency storage tier may be utilized to store data that is infrequently accessed, data that is sequentially accessed, and/or data that is to be stored long term. Accordingly, one or more techniques and/or systems for storing data within the hybrid storage aggregate are provided herein.

Figure 2:
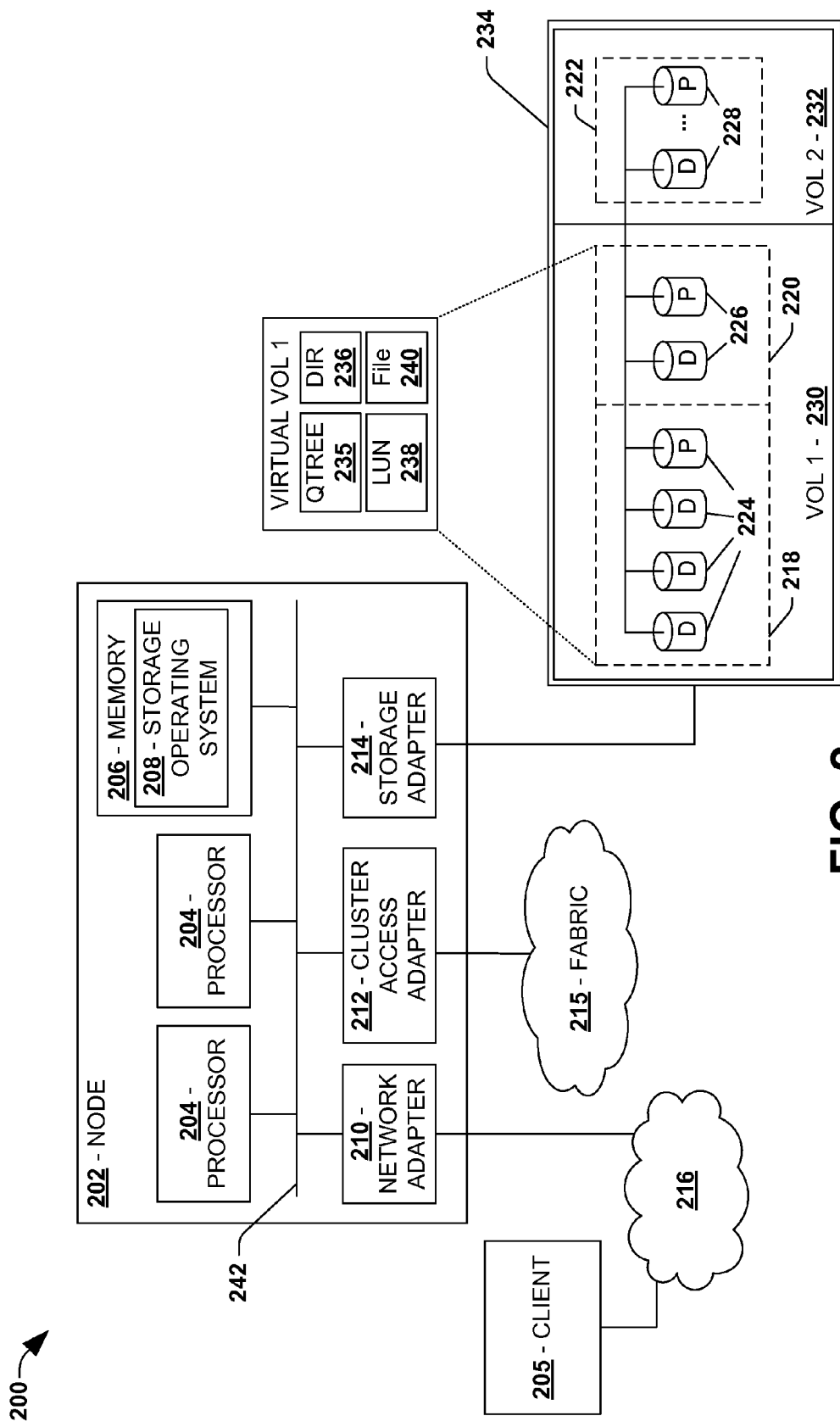
FIG. 2 is a component block diagram illustrating an example data storage system in accordance with one or more of the provisions set forth herein.

To provide context for storing data within a hybrid storage aggregate, FIG. 1 illustrates a clustered network environment 100 (e.g., a network storage environment), and FIG. 2 illustrates an embodiment of a data storage system 200 (e.g., comprising a storage server) that may be implemented as a hybrid storage aggregate. For example, the hybrid storage aggregate may comprise data storage devices 128, 130, data storage device 234, and/or other data storage devices not illustrated. Nodes 116, 118 and/or node 202 may be implemented as storage servers configured to store data and/or provide clients 108, 110 and/or client 205 with access to data stored within the hybrid storage aggregate. For example, nodes 116, 118 and/or node 202 may comprise components configured to store data within the hybrid storage aggregate, such as a read caching component, a write caching component, and/or an eviction component. It may be appreciated, however, that the techniques, etc. described herein may be implemented within the clustered network environment 100, a non-cluster network environment, and/or a variety of other computing environments. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that a hybrid storage aggregate may be implemented within clustered network environment 100. For example, the hybrid storage aggregate may comprise storage device 128, 130 and/or other storage devices not illustrated. Nodes 116, 118 may be implemented as storage servers configured to store data and/or provide clients 108, 110 with access to data stored within the hybrid storage aggregate. For example, nodes 116 and 118 may comprise components configured to store data within the hybrid storage aggregate, such as a read caching component, a write caching component, and/or an eviction component.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that a hybrid storage aggregate may be implemented within data storage system 200. For example, the hybrid storage aggregate may comprise storage device 234 (e.g., disks 224, 226, and/or 228) and/or other storage devices not illustrated. Node 202 may be implemented as a storage server configured to store data and/or provide client 205 with access to data stored within the hybrid storage aggregate. For example, node 202 may comprise components configured to store data within the hybrid storage aggregate, such as a read caching component, a write caching component, and/or an eviction component.

Figure 3:
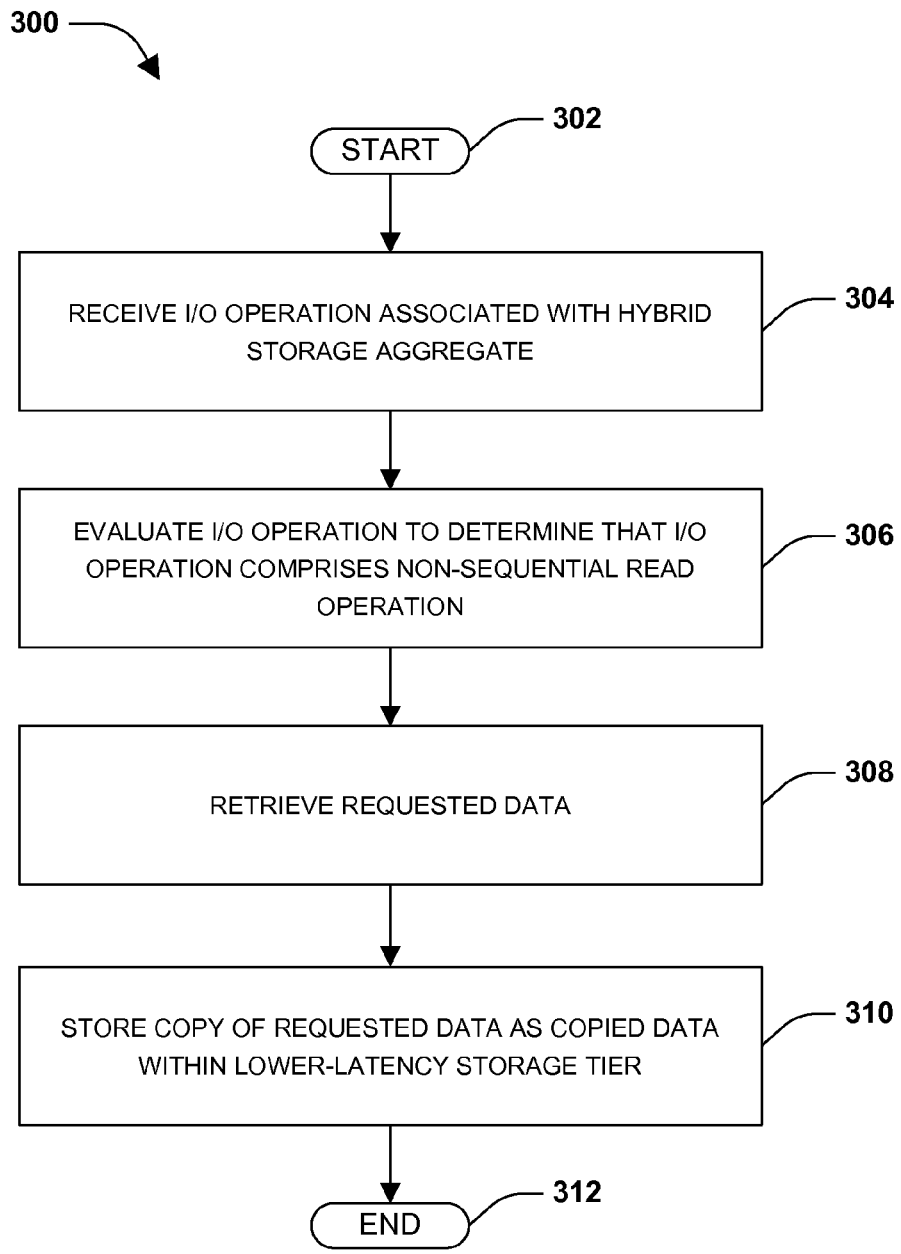
FIG. 3 is a flow chart illustrating an exemplary method of storing data within a hybrid storage aggregate.

One embodiment of storing data within a hybrid storage aggregate is illustrated by an exemplary method 300 in FIG. 3. At 302, the method starts. The hybrid storage aggregate may comprise a lower-latency storage tier and a higher-latency storage tier. The lower-latency storage tier may comprise electronic storage media (e.g., one or more solid state storage devices), and the higher-latency storage tier may comprise magnetic storage media (e.g., one or more hard disk drives). It may be advantageous to store randomly accessed data, frequently accessed data, short lived data, and/or data that is designated for low latency access (e.g., metadata, a service level objective (SLO), etc.) within the lower-latency storage tier (e.g., a solid state storage device within the lower-latency storage tier may provide decreased latency, high I/O operations per second, and improved access time for randomly accessed data in comparison with a hard disk drive within the higher-latency storage tier that may experience mechanical delays from accessing non-sequential data), while storing sequentially accessed and/or infrequently accessed data within the higher-latency storage tier (e.g., a hard disk drive within the higher-latency storage tier may provide cost effective storage with comparable access times for accessing sequential data).

Because the hybrid storage aggregate may comprise a logical aggregate of storage devices as a single logical container, various functionality may be implemented across the higher-latency storage tier and the lower-latency storage tier. In one example, a volume of data may be stored across both the higher-latency storage tier and the lower-latency storage tier (e.g., data within the volume may be stored within at least some of the higher-latency storage tier and within at least some of the lower-latency storage tier). In another example, the lower-latency storage tier may be implemented as a persistent cache, while the higher-latency storage tier may be implemented as persistent long term storage. In another example, a file system may be implemented across the higher-latency storage tier and the lower-latency storage tier, which may allow for various file system functionality and/or APIs to operate upon both storage tiers (e.g., storage functionality, such as deduplication, backup/restore, caching, etc.). In another example, metadata associated with the hybrid storage aggregate (e.g., metadata describing the lower-latency storage tier and/or the higher-latency storage tier) may be stored within the lower-latency storage tier so that the metadata may be retrieved with decreased latency. In another example, multiple RAID groups of different storage types may be implemented across both storage tiers (e.g., an SSD RAID group may be non-disruptively added to an HDD RAID group). It may be appreciated that conventional storage systems may comprise either SSD RAID groups or HDD RAID groups, but not both within a single aggregate storage system. Accordingly, the hybrid storage aggregate may comprise both the lower-latency storage tier which may comprise a first RAID group comprising electronic storage media (e.g., an SSD RAID group) and the higher-latency storage tier which may comprise a second RAID group comprising magnetic storage media (e.g., HDD RAID group), for example.

At 304, an I/O operation associated with the hybrid storage aggregate may be received. For example, a node, such as a storage server, may receive the I/O operation from a client. At 306, the I/O operation may be evaluated to determine that the I/O operation comprises a non-sequential read operation for requested data within the higher-latency storage tier, data designated for low latency access, and/or a read operation for requested data predicted to be accessed frequently. In one example, the non-sequential read operation may comprise a non-sequential hot read operation (e.g., a read operation to frequently accessed data that may be stored non-sequentially within the higher-latency storage tier). In one example of identifying the non-sequential read operation, values of block offsets specified within the I/O operation may be compared to determine whether the block offsets are sequential (e.g., the I/O operation specifies that requested data is to be read from block offsets 7, 8, 9, and 10 within a data volume) or non-sequential (e.g., the I/O operation specifies that requested data is to be read from block offsets 20, 35, 39, and 50 within the data volume). If the requested data is determined as being accessed non-sequentially, then the I/O operation may be determined as comprising the non-sequential read operation. In another example of identifying the non-sequential read operation (e.g., a non-sequential hot read operation), a temperature metric may be maintained for data stored within the hybrid storage aggregate. The temperature metric may indicate whether data is frequently accessed (e.g., "hot) or infrequently accessed (e.g., "cold"). If a temperature metric for the requested data indicates that the requested data is accessed above a threshold frequency, then the I/O operation may be determined as comprising the non-sequential hot read operation. It may be appreciated that the threshold frequency may correspond to one or more accesses (e.g., an initial access, a threshold number of accesses within a predefined time span, more than one access within a predefined time span, etc.)

At 308, the requested data may be retrieved from the higher-latency storage tier. In one example, the requested data may be stored within a buffer cache (e.g., so that the requested data may be copied to the lower-latency storage tier without having to access the higher-latency storage tier). At 310, a copy of the requested data may be stored (e.g., persistently cached) as copied data within the lower-latency storage tier based upon the determination that the I/O operation comprises the non-sequential read operation (e.g., the requested data within the cache buffer may be stored within the lower-latency storage tier as the copied data). Because the lower-latency storage tier may be configured as a cache, the requested data may remain within the higher-latency storage tier. That is, merely a copy of the requested data may be stored within the lower-latency storage tier as the copied data. An entry within a cache map indicating that the copied data was stored within the lower-latency storage tier using requested data from the higher-latency storage tier may be made. The cache map may comprise entries associated with copied data copied (e.g., cached) from the higher-latency storage tier to the lower-latency storage tier. In one example, the cache map may be integrated into a file system of the hybrid storage aggregate, and thus may provide information regarding copied data within the lower-latency storage tier to various file system functionality (e.g., caching functionality, deduplication functionality, backup/restore functionality, etc.).

A temperature metric may be maintained for the copied data. The temperature metric may be indicative of a frequency at which the copied data is accessed (e.g., a number of I/O accesses to the copied data over a particular time span). If the temperature metric falls below a threshold, then the copied data may be evicted from the lower-latency storage tier. That is, the copied data may become "cold" due to infrequent access, and thus it may be cost effective to migrate the copied data to the higher-latency storage tier. In one example of eviction (e.g., where the requested data is already in the higher-latency storage tier), the copied data may be removed from the lower-latency storage tier and the entry within the cache map may be removed. In this way, the higher-latency storage tier may comprise the original requested data, which may be used to satisfy future I/O operations. At 312, the method ends.

Figure 4:
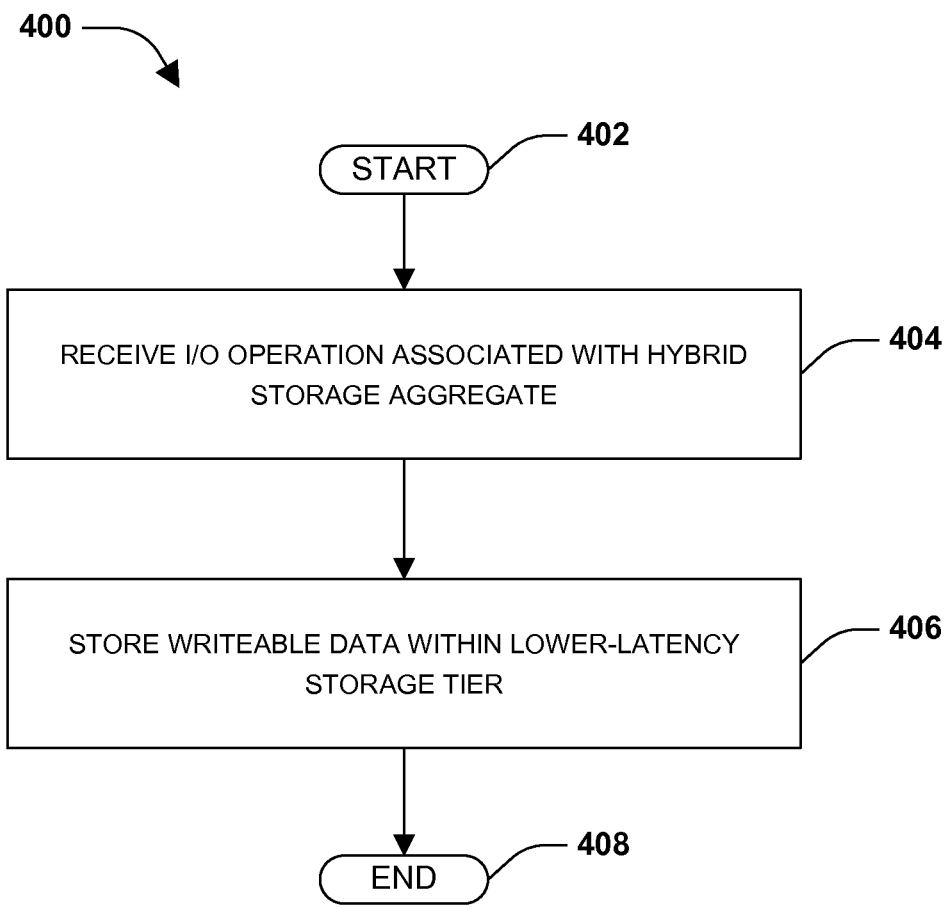
FIG. 4 is a flow chart illustrating an exemplary method of storing data within a hybrid storage aggregate.

One embodiment of storing data within a hybrid storage aggregate is illustrated by exemplary method 400 in FIG. 4. At 402, the method starts. The hybrid storage aggregate may comprise a lower-latency storage tier and a higher-latency storage tier. The lower-latency storage tier may comprise electronic storage media (e.g., one or more solid state storage devices), and the higher-latency storage tier may comprise magnetic storage media (e.g., one or more hard disk drives). It may be advantageous to store randomly accessed data, frequently accessed data, and/or short lived data within the lower-latency storage tier (e.g., a solid state storage device within the lower-latency storage tier may provide decreased latency and improved access time for randomly accessed data in comparison with a hard disk drive within the higher-latency storage tier that may experience mechanical delays from accessing non-sequential data), while storing sequentially accessed and/or infrequently accessed data within the higher-latency storage tier (e.g., a hard disk drive within the higher-latency storage tier may provide cost effective storage with comparable access times relative to a solid state storage device for accessing sequential data).

At 404, an I/O operation associated with the hybrid storage aggregate may be received (e.g., by a node, such as a storage server, configured to store data and/or provide clients with access to data within the hybrid storage aggregate). The I/O operation may comprise writeable data. In one example, the I/O operation may be determined as comprising a non-sequential write operation based upon a determination that the writeable data is to be written non-sequentially and/or a prediction that the writeable data is to be accessed above a threshold frequency (e.g., a non-sequential hot write operation). At 406, the writeable data may be stored within the lower-latency storage tier based upon the I/O operation comprising the non-sequential write operation of the writeable data and/or based upon a prediction that the writeable data will be short lived in memory. In one example, the writeable data may not, however, be stored within the higher-latency storage tier in order to reduce access operations to the higher-latency storage tier. Because the writeable data may be merely stored within the lower-latency storage tier (e.g., and not within the higher-latency storage tier), an entry may not be made within a cache map.

A temperature metric may be maintained for the writeable data. If the temperate metric falls below a threshold, then the writeable data may be evicted from the lower-latency storage tier. For example, the writeable data may be migrated from the lower-latency storage tier to the higher-latency storage tier because a copy of the writeable data may not already exist within the higher-latency storage tier (e.g., the writeable data may be removed from the lower-latency storage tier, and a migrated copy of the writeable data may be stored within the higher-latency storage tier). At 408, the method ends.

Figure 5:
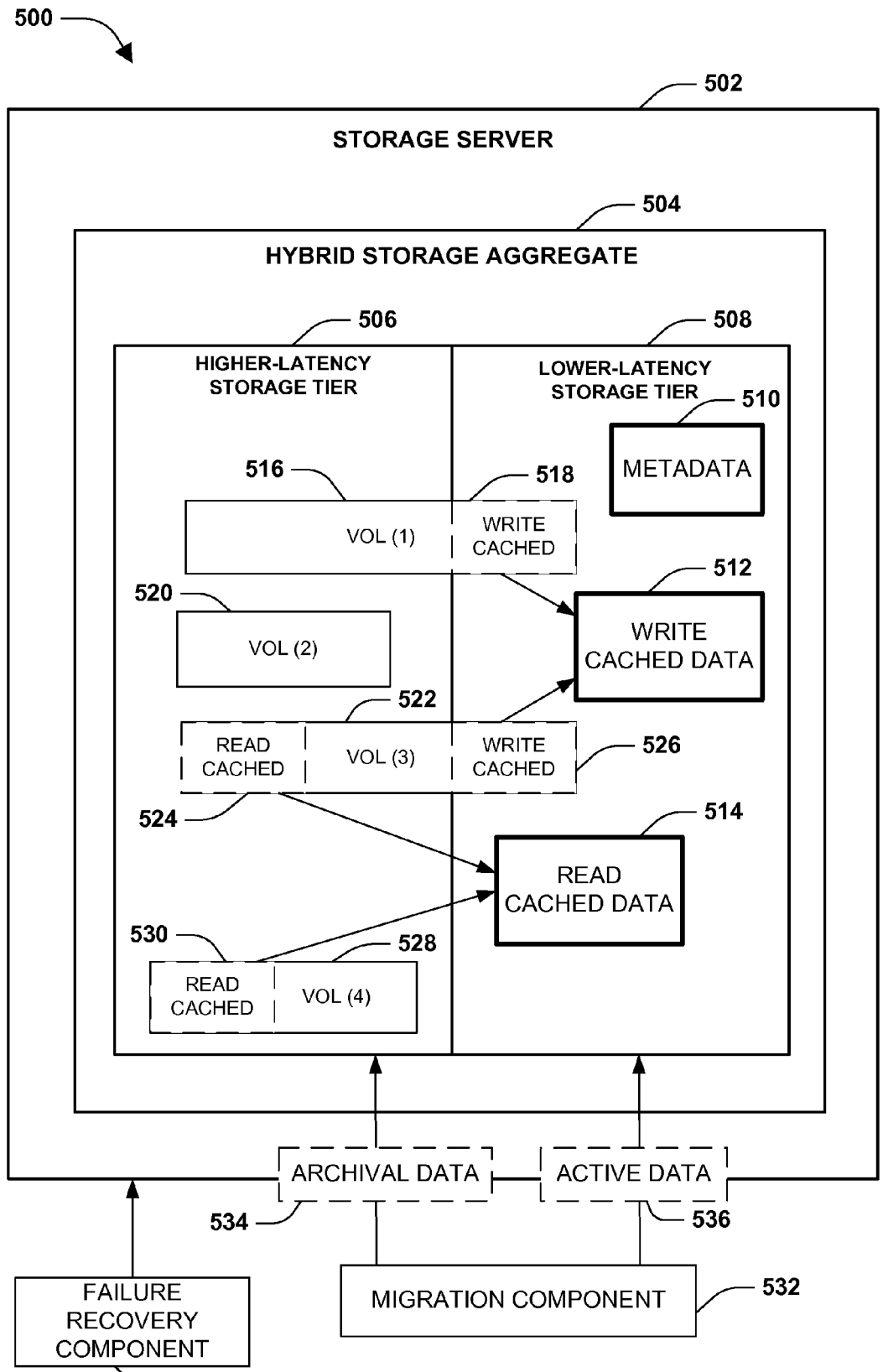
FIG. 5 is an illustration of an example of a hybrid storage aggregate comprising a higher-latency storage tier and a lower-latency storage tier.

FIG. 5 illustrates an example 500 of a hybrid storage aggregate 504 comprising a higher-latency storage tier 506 and a lower-latency storage tier 508. A storage server 502 may be configured to store data and/or provide clients with access to data stored within the hybrid storage aggregate 504. One or more data volumes (e.g., volume (1), volume (2), volume (3), and/or volume (4)), and/or metadata 510 of the hybrid storage aggregate 504 may be stored across the higher-latency storage tier 506 and/or the lower-latency storage tier 508. In one example, a first portion 516 of volume (1) may be stored within the higher-latency storage tier 506 (e.g., the first portion 516 may comprise sequential data and/or infrequently accessed data). A second portion 518 of volume (1) may be stored within the lower-latency storage tier 508, and may not be stored within the higher-latency storage tier 506 (e.g., the second portion 518 may comprise non-sequential data and/or frequently accessed data). That is, the second portion 518 of volume (1) may have been stored as write cached data 512 within the lower-latency storage tier 508 based upon an initial non-sequential write operation of writeable data not yet stored within the higher-latency storage tier 506 (e.g., storing the second portion 518 merely within the lower-latency storage tier 508 may reduce access and/or latency associated with additionally storing the second portion 518 within the higher-latency storage tier 506).

Volume (2) 520 may be stored within the higher-latency storage tier 506 (e.g., volume (2) 520 may comprise sequential data and/or infrequently accessed data). A first portion 524 of volume (3) may be stored within the higher-latency storage tier 506 and the lower-latency storage tier 508. That is, the second portion 524 of volume (3) may have been stored as read cached data 514 based upon a non-sequential read operation of requested data already stored as the first portion 524 within the higher-latency storage tier 506 (e.g., the request data of the first portion 524 may have been stored as copied data within the read cached data 514 based upon the non-sequential read operation). A second portion 522 of volume (3) may be stored within the higher-latency storage tier 506 (e.g., the second portion 522 may comprise sequential data and/or infrequently accessed data). A third portion 526 of volume (3) may be stored within the lower-latency storage tier 508, and may not be stored within the higher-latency storage tier 506 (e.g., the third portion 526 may comprise non-sequential data and/or frequently accessed data). That is, the third portion 526 of volume (3) may have been stored as write cached data 512 within the lower-latency storage tier 508 based upon an initial non-sequential write operation of writeable data not yet stored within the higher-latency storage tier 506 (e.g., storing the third portion 526 merely within the lower-latency storage tier 508 may reduce access and/or latency associated with additionally storing the third portion 526 within the higher-latency storage tier 506).

A first portion 530 of volume (4) may be stored within the higher-latency storage tier 506 and the lower-latency storage tier 508. That is, the first portion 530 of volume (4) may have been stored as read cached data 514 based upon a non-sequential read operation of requested data already stored as the first portion 530 within the higher-latency storage tier 506 (e.g., the request data of the first portion 530 may have been stored as copied data within the read cached data 514). A second portion 528 of volume (4) may be stored within the higher-latency storage tier 506 (e.g., the second portion 528 of volume (4) may comprise sequential data and/or infrequently accessed data).

In one example, a migration component 532 may be implemented for the hybrid storage aggregate 504. The migration component 532 may be configured to efficiently migrate data between the higher-latency storage tier 506 and the lower-latency storage tier 508 because the hybrid storage aggregate 504 may be implemented as a single logical container. The migration component 532 may migrate archival data 534 from the lower-latency storage tier 508 to the higher-latency storage tier 506 based upon the archival data 534 being accessed below a threshold frequency and/or the archival data 534 being designated for long-term storage. The migration component 532 may migrate active data 536 from the higher-latency storage tier 506 to the lower-latency storage tier 508 based upon the active data 536 being accessed above a threshold frequency and/or the active data 536 being designated for short-term use.

In one example, a failure recovery component 538 may be implemented for the hybrid storage aggregate 504. The failure recovery component 538 may be configured to provide failure recovery from a storage server failure, a storage device failure, and/or other failures that may be associated with the hybrid storage aggregate 504. In one example, the failure recovery component 538 may be configured to detect a failure of the storage server 502. Upon detecting the failure, the failure recovery component 538 may be configured to assign ownership of the hybrid storage aggregate 504 from the storage server 502 to a second storage server not illustrated. In this way, the second storage server may manage the hybrid storage aggregate 504. In another example, the failure recovery component 538 may be configured to detect a failure of a storage device within the low-latency storage tier and/or the higher-latency storage tier. Upon detecting the failure, the failure recovery component 538 may be configured to facilitate replacement of the failed storage device with a replacement storage device.

Figure 6:
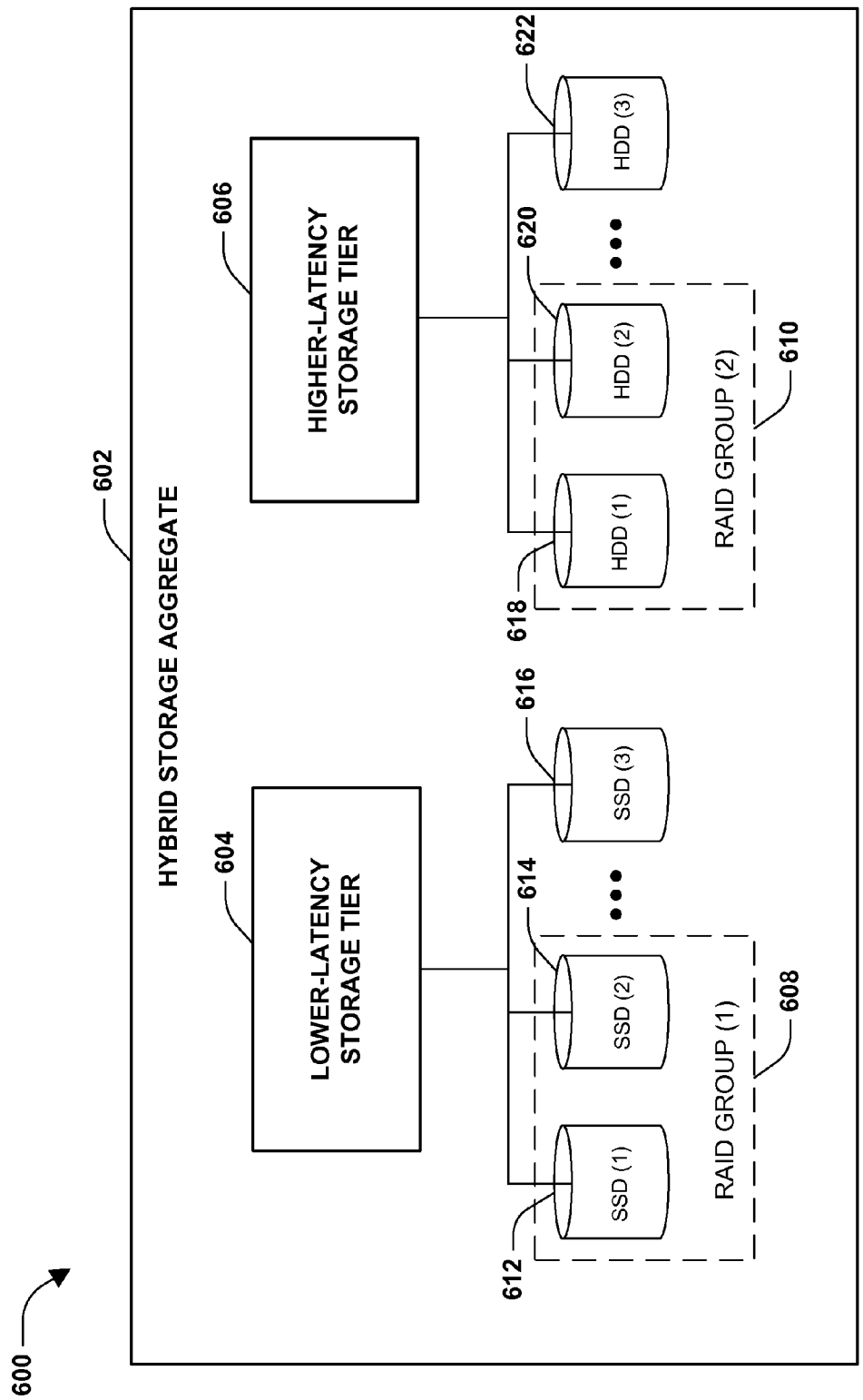
FIG. 6 is an illustration of an example of a hybrid storage aggregate.

FIG. 6 illustrates an example 600 of a hybrid storage aggregate 602. The hybrid storage aggregate 602 may comprise a lower-latency storage tier 604 and/or a higher-latency storage tier 606. The higher-latency storage tier 606 may comprise magnetic storage media, such as one or more hard disk drives (e.g., HDD (1) 618, HDD (2) 620, HDD (3) 622, and/or other hard disk drives not illustrated). The higher-latency storage tier 606 may comprise a RAID group (2) 610 comprising HDD (1) 618 and HDD (2) 620, for example. The lower-latency storage tier 604 may comprise electronic storage media, such as one or more solid state drives (e.g., SSD (1) 612, SSD (2) 614, SSD (3) 616, and/or other solid state drives not illustrated). The lower-latency storage tier 604 may comprise a RAID group (1) 608 comprising SSD (1) 612 and SSD (2) 614, for example. In one example, if the RAID group (2) 610 existed within the hybrid storage aggregate 602 before the RAID group (1) 608, then the RAID group (1) 608 may be non-disruptively added to the hybrid storage aggregate 602 (e.g., the RAID group (2) 610 may be/remain accessible for I/O operations while RAID group (1) 608 is added to the hybrid storage aggregate 602).

Figure 7:
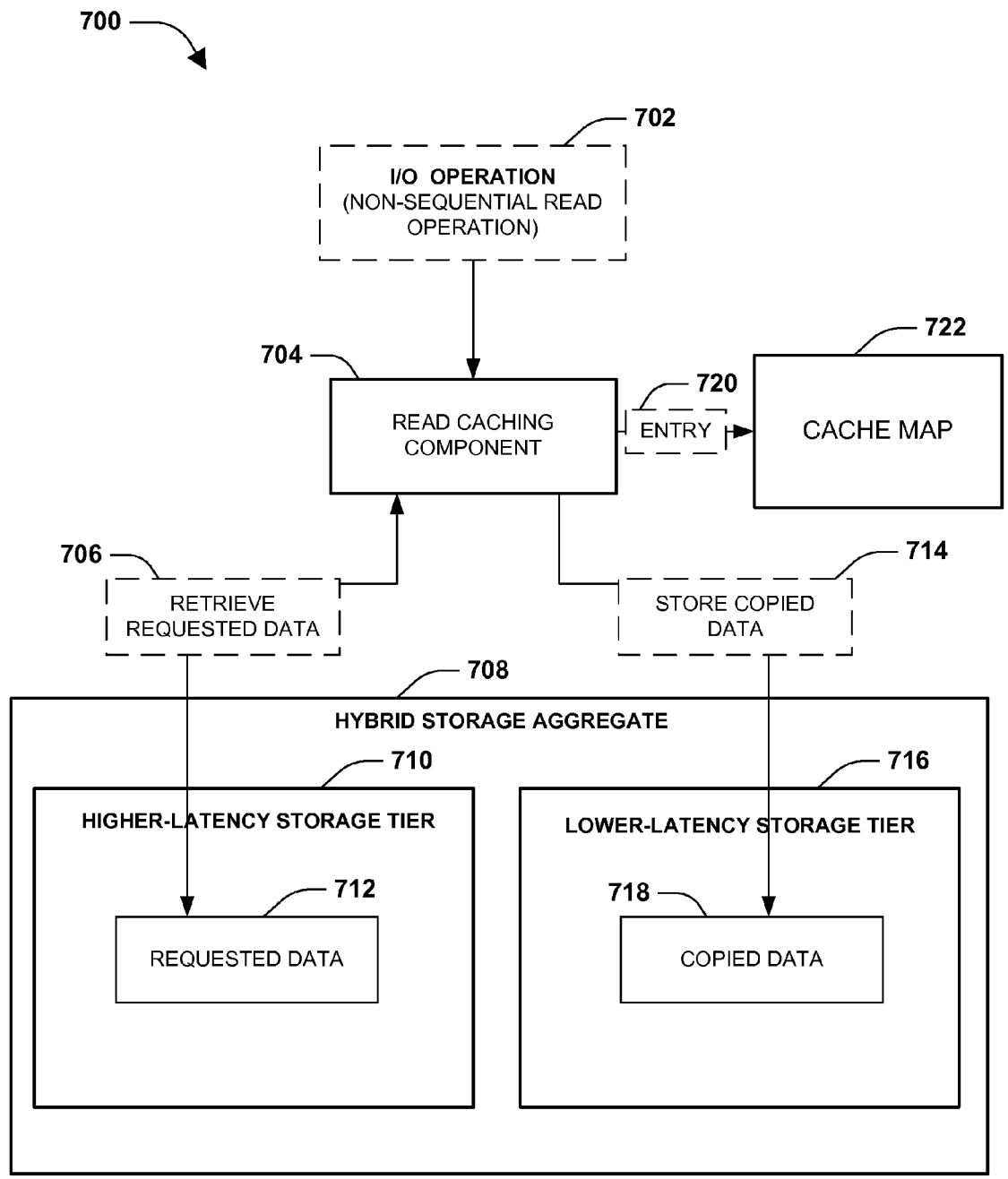
FIG. 7 is a component block diagram illustrating an exemplary system for storing data within a hybrid storage aggregate.

FIG. 7 illustrates an example of a system 700 configured for storing data within a hybrid storage aggregate 708. The hybrid storage aggregate 708 may comprise a higher-latency storage tier 710 and a lower-latency storage tier 716. The system 700 may comprise a read caching component 704 configured to cache requested data 712 (e.g., frequently accessed data and/or non-sequential data) from the higher-latency storage tier 710 to the lower-latency storage tier 716 as copied data 718. It may be appreciated that in one example, the read caching component 704 may be implemented within a storage server (e.g., nodes 118, 120, and 202 of FIGS. 1 and 2).

In one example, the read caching component 704 may receive an I/O operation 702 associated with the hybrid storage aggregate 708. The I/O operation 702 may be evaluated to determine that the I/O operation comprises a non-sequential read operation for the requested data 712 within the higher-latency storage tier 710. In one example, values of block offsets specified within the I/O operation 702 may be compared to determine whether the block offsets are sequential (e.g., the I/O operation 702 specifies that requested data is to be read from block offsets 7, 8, 9, and 10 within a data volume) or non-sequential (e.g., the I/O operation 702 specifies that requested data is to be read from block offsets 20, 35, 39, and 50 within the data volume). In another example, a temperature metric may be maintained for the requested data 712, and may indicate whether the requested data is frequently accessed (e.g., a non-sequential "hot" read operation) or infrequently accessed (e.g., "cold").

Upon determining the I/O operation 702 comprising the non-sequential read operation, the read caching component 704 may retrieve 706 the requested data from the higher-latency storage tier 710 to satisfy the I/O operation 702. In one example, the requested data may be stored within a buffer cache (e.g., so that the requested data may be copied to the lower-latency storage tier without having to access the higher-latency storage tier). The read caching component 704 may retain the requested data 712 within the higher-latency storage tier 710, and may copy 714 the requested data 712 to the lower-latency storage tier 716 as the copied data 718 (e.g., because the copied data 718 may be maintained as cached data to satisfy future requests but may be evicted at some point from the lower-latency storage tier 716 back to the higher-latency storage tier 710). The read caching component 704 may make an entry 720 within a cache map 722. The entry 720 may indicate that the copied data 718 was copied from the requested data 712.

In one example, a subsequent I/O operation may request the requested data 712. The cache map 722 may be consulted to determine whether the requested data 712 is stored/cached within the lower-latency storage tier 716 as the copied data 718 (e.g., a lookup may be performed to identify whether entry 720 (e.g., mapping a location of the requested data 712 within the higher-latency storage tier 710 to a location of the copied data 718 within the lower-latency storage tier 716) exists within the cache map 722). Because entry 720 may be identified within the cache map 722, the subsequent I/O operation may be satisfied using the copied data 718 within the lower-latency storage tier 716 (e.g., because the subsequent I/O operation may access the copied data 718 at a lower latency from the lower-latency storage tier 716 than if the subsequent I/O operation accessed the requested data 712 from the higher-latency storage tier 710). In this way, the read caching component 704 may cache data read from the higher-latency storage tier 710 to the lower-latency storage tier 716 (e.g., to facilitate faster/more efficient subsequent data access).

Figure 8:
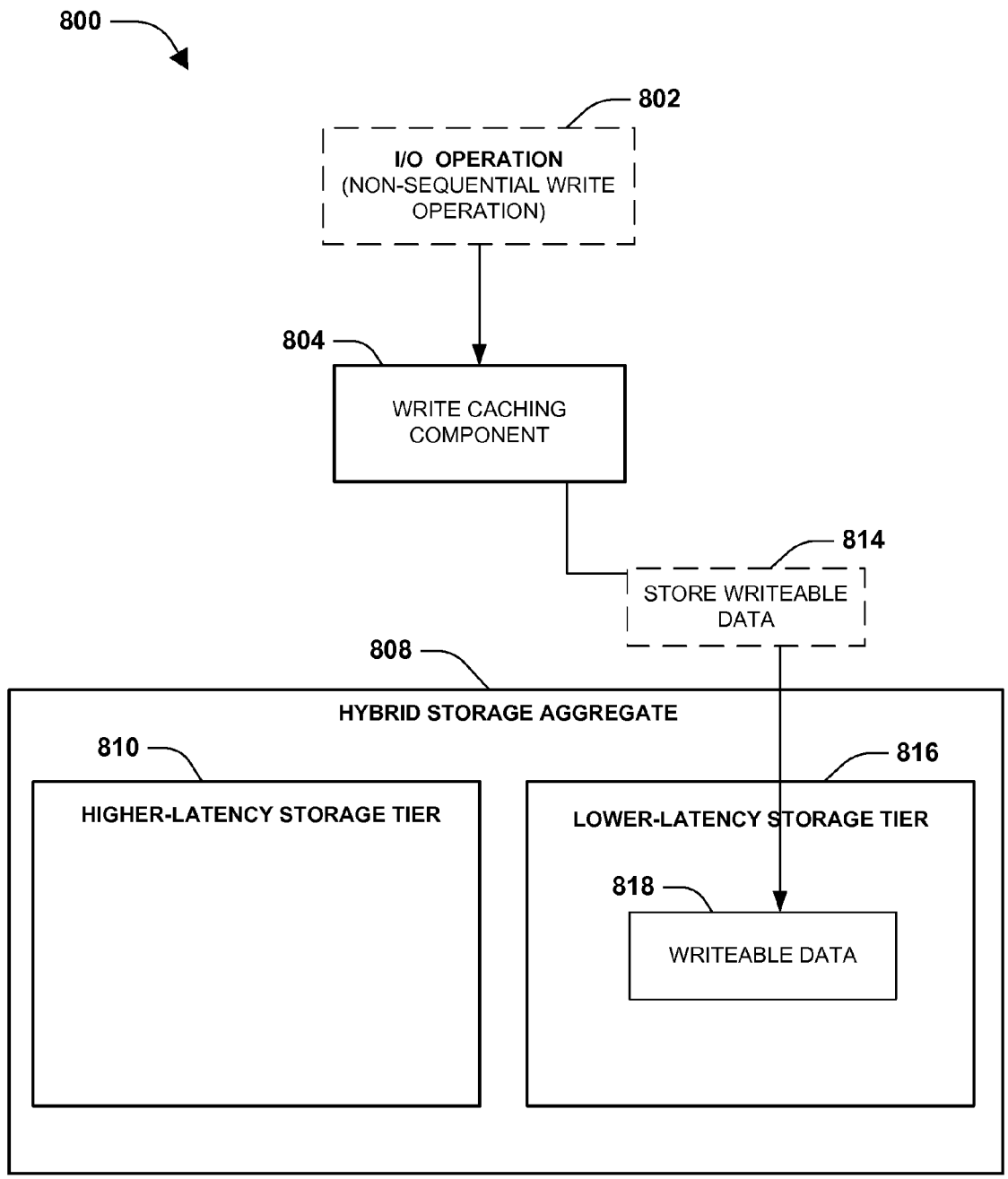
FIG. 8 is a component block diagram illustrating an exemplary system for storing data within a hybrid storage aggregate.

FIG. 8 illustrates an example of a system 800 configured for storing data within a hybrid storage aggregate 808. The hybrid storage aggregate 808 may comprise a higher-latency storage tier 810 and a lower-latency storage tier 816. The system 800 may comprise a write caching component 804 configured to cache writeable data (e.g., non-sequential writeable data that is to be written to storage) within the lower-latency storage tier 816 as writeable data 818. It may be appreciated that in one example, the write caching component 804 may be implemented within a storage server (e.g., nodes 118, 120, and 202 of FIGS. 1 and 2).

In one example, the write caching component 804 may receive an I/O operation 802 associated with the hybrid storage aggregate 808. In one example, the I/O operation 802 may be evaluated to determine that the I/O operation comprises a non-sequential write operation of writeable data. For example, the write caching component 804 may determine that the writeable data is to be written non-sequentially (e.g., within non-sequential block offsets) and/or predict that the writeable data will be accessed above a frequency threshold (e.g., a non-sequential hot write operation). In another example, the write caching component 804 may predict that the writeable data will be short lived in memory. In this way, the write caching component 804 may determine that requested data associated with the I/O operation is to be stored within the low-latency storage tier 816 (e.g., based upon random access of the writeable data, frequent access of the writeable data, and/or a predicted short life span in memory of the writeable data).

The write caching component 804 may store 814 the writeable data within the lower-latency storage tier 816 as the writeable data 818 (e.g., the write caching component 804 may cache the writeable data 818 persistently). To avoid additional I/O operations, the write caching component 804 may refrain from additionally storing the writeable data 818 within the higher-latency storage tier 810. In this way, the write caching component 804 may cache writeable data to the lower-latency storage tier 816.

Figure 9:
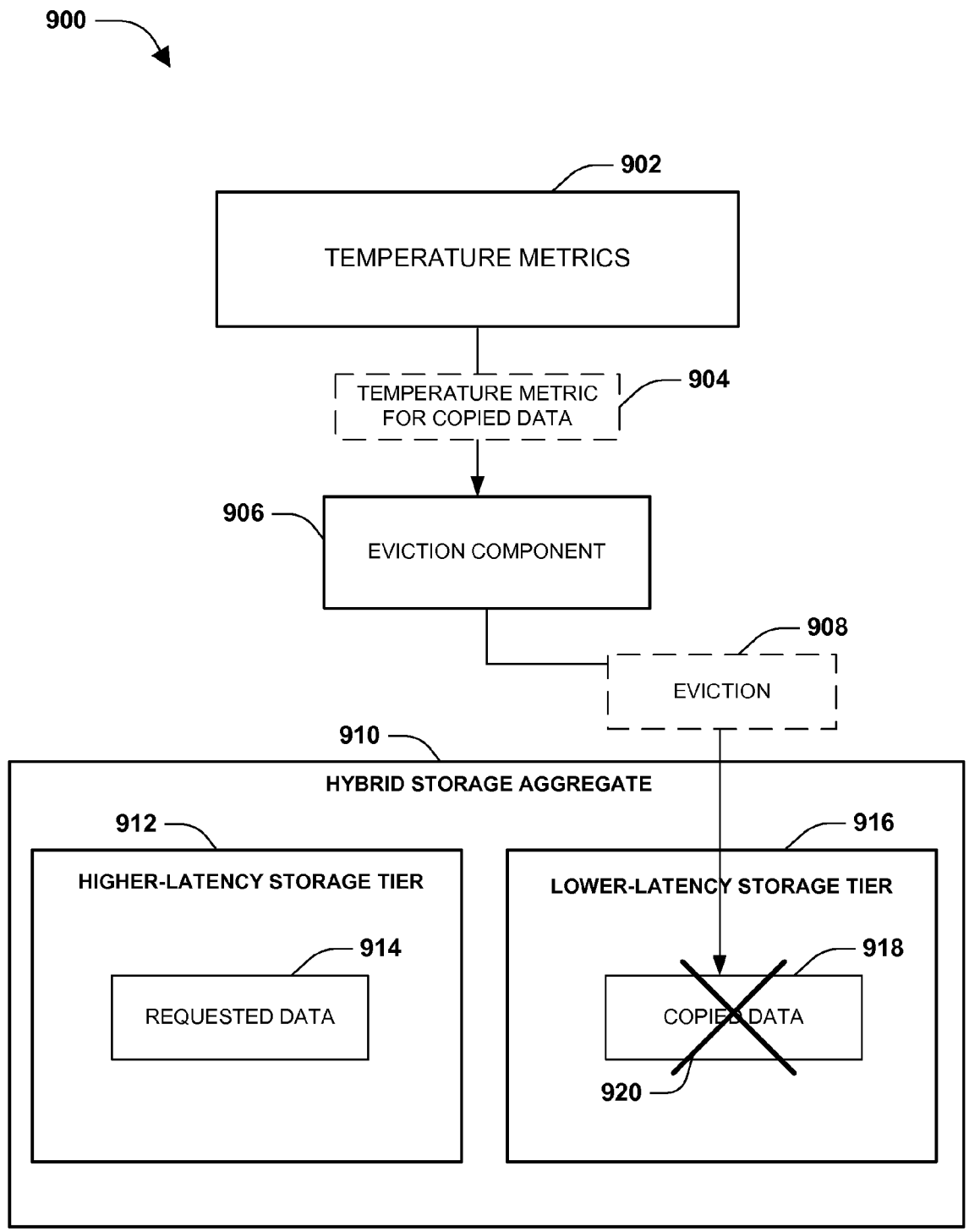
FIG. 9 is a component block diagram illustrating an exemplary system for storing data within a hybrid storage aggregate.

FIG. 9 illustrates an example of a system 900 configured for storing data within a hybrid storage aggregate 910. The hybrid storage aggregate 910 may comprise a higher-latency storage tier 912 and a lower-latency storage tier 916. In one example, the higher-latency storage tier 912 may comprise requested data 914 (e.g., data stored within the higher-latency storage tier 912 that may have been requested by a non-sequential read operation), and the lower-latency storage tier 916 may comprise copied data 918 derived from the requested data 914 (e.g., a read caching component may have cached a copy of the requested data 914 into the lower-latency storage tier 916 as the copied data 918).

The system 900 may comprise an eviction component 906. The eviction component 906 may maintain temperature metrics 902 for data stored within the hybrid storage aggregate 910. In one example, the eviction component 906 may evaluate a temperature metric 904 for the copied data 918. The temperature metric 904 may indicate a frequency at which the copied data 918 is accessed. If the temperature metric 904 falls below a threshold (e.g., the copied data 918 has become "cold" due to infrequent access), then the eviction component 906 may evict 908 the copied data 918 from the lower-latency storage tier 916. For example, the eviction component 906 may remove 920 the copied data 918 from the lower-latency storage tier 916. The eviction component 908 may remove an entry in a cache map that may have indicated that the copied data 918 was cached within the lower-latency storage tier 916 using the requested data 914. In this way, the higher-latency storage tier 912 may still comprise the requested data 914. It may be advantageous to store the requested data 914 within the higher latency storage tier 912 without retaining the copied data 918 because the higher-latency storage tier 912 may provide cost effective storage for infrequently accessed (e.g., "cold") data.

Figure 10:
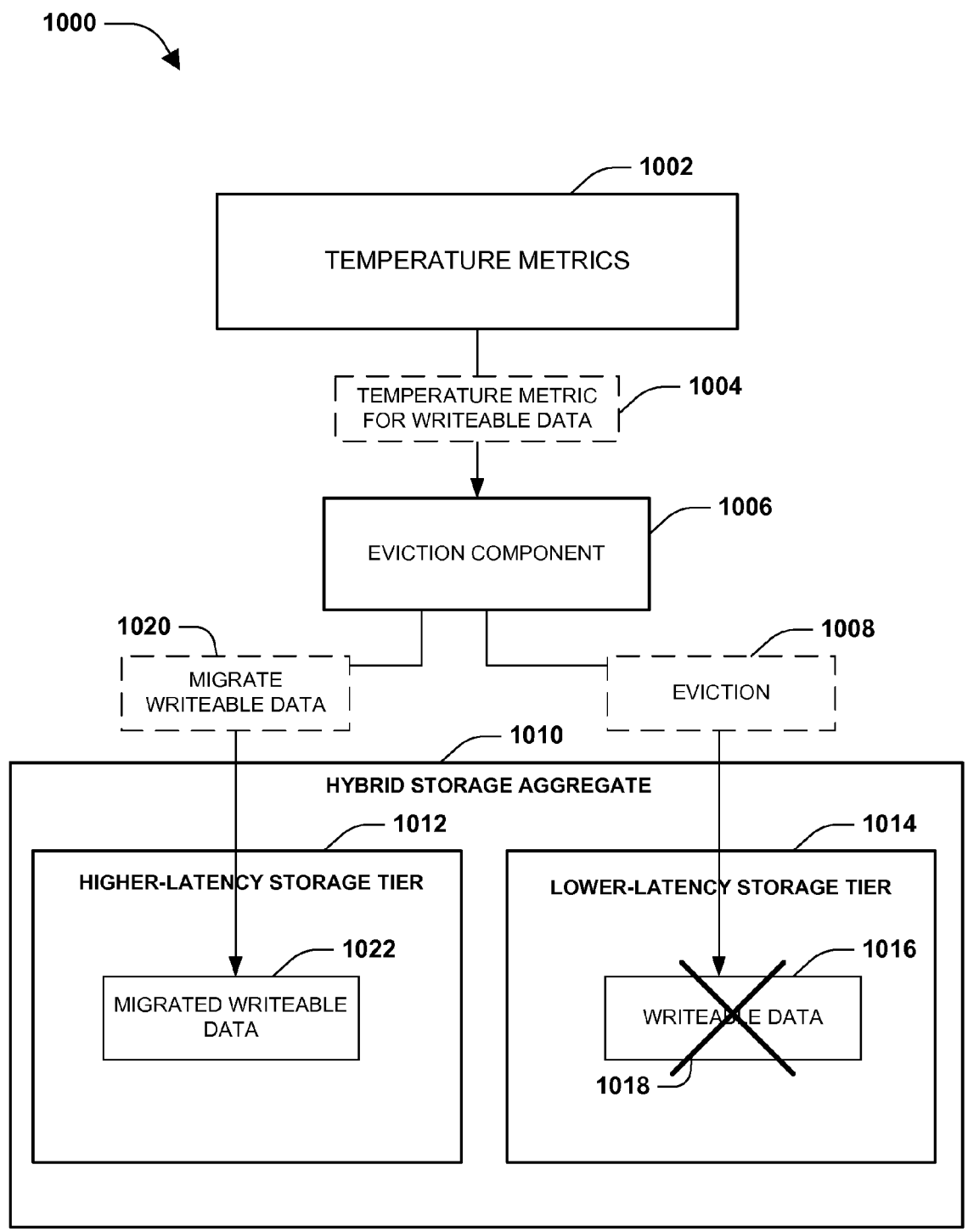
FIG. 10 is a component block diagram illustrating an exemplary system for storing data within a hybrid storage aggregate.

FIG. 10 illustrates an example of a system 1000 configured for storing data within a hybrid storage aggregate 1010. The hybrid storage aggregate 1010 may comprise a higher-latency storage tier 1012 and a lower-latency storage tier 1014. In one example, the lower-latency storage tier 1014 may comprise writeable data 1016 (e.g., a write caching component may have cached writeable data from a non-sequential write operation into the lower-latency storage tier 1014 as the writeable data 1016).

The system 1000 may comprise an eviction component 1006. The eviction component 1006 may maintain temperature metrics 1002 for data stored within the hybrid storage aggregate 1010. In one example, the eviction component 1006 may evaluate a temperature metric 1004 for the writeable data 1016. The temperature metric 1004 may indicate a frequency at which the writeable data 1016 is accessed. If the temperature metric 1004 falls below a threshold (e.g., the writeable data 1016 has become "cold" due to infrequent access), then the eviction component 1006 may evict 1008 the writeable data 1016 from the lower-latency storage tier 1014. For example, the eviction component 1006 may remove 1018 the writeable data 1016 from the lower-latency storage tier 1014. The eviction component 1006 may migrate 1020 the writeable data 1016 from the lower-latency storage tier 1014 to the higher-latency storage tier 1012 as migrated writeable data 1022 (e.g., because an instance of the writeable data 1016 may not already exist within the higher-latency storage tier 1012). In this way, the higher-latency storage tier 1012 may comprise the migrated writeable data 1022. It may be advantageous to store the migrated writeable data 1022 within the higher latency storage tier 1012 without retaining the writeable data 1016 because the higher-latency storage tier 1012 may provide cost effective storage for infrequently accessed (e.g., "cold") data.

Figure 11:
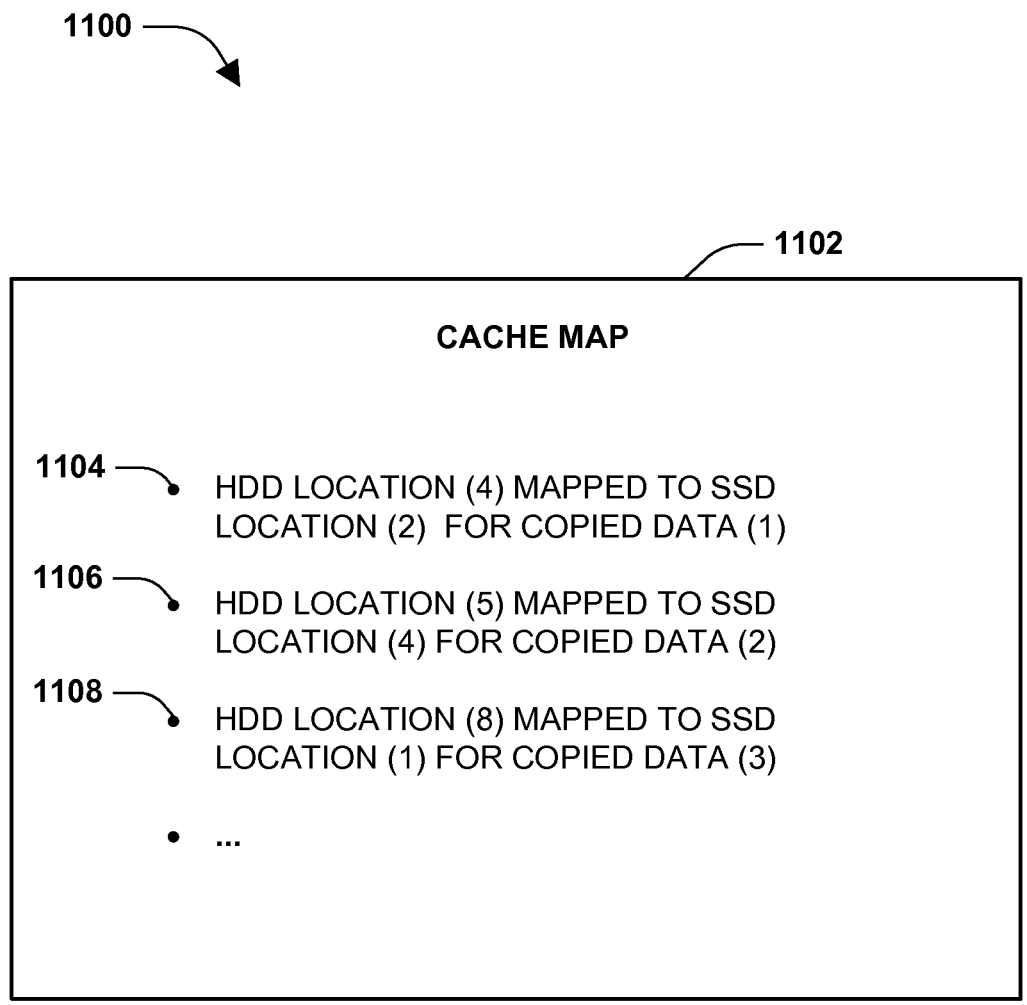
FIG. 11 is an illustration of an example of a cache map.

FIG. 11 illustrates an example 1100 of a cache map 1102. The cache map 1102 may comprise one or more entries associated with copied data stored (e.g., cached) within a lower-latency storage tier of a hybrid storage aggregate. The copied data may have been copied from requested data (e.g., data requested by a non-sequential read operation) stored within a higher-latency storage tier of the hybrid storage aggregate. For example, the cache map 1102 may comprise a first entry 1104 specifying that copied data (1) was cached within a solid state drive (2) using requested data (1) stored within a hard disk drive (4) of the higher-latency storage tier. The cache map 1102 may comprise a second entry 1106 specifying that copied data (2) was cached within the solid state drive (4) using requested data (2) stored within a hard disk drive (5) of the higher-latency storage tier. The cache map 1102 may comprise a third entry 1108 specifying that copied data (3) was cached within a solid state drive (1) using requested data (3) stored within a hard disk drive (8) of the higher-latency storage tier. It may be appreciated that entries within the cache map 1102 may be implemented in various ways. In one example, an entry may map a logical location within a virtual volume of the higher-latency storage tier (e.g., a virtual volume block number) to a logical location within the lower-latency storage tier (e.g., a solid state drive virtual volume block number). In another example, an entry may map a physical location within a physical volume of the higher-latency storage tier (e.g., a physical volume block number) to a physical location within the lower-latency storage tier (e.g., a solid state drive physical volume block number). In this way, various storage APIs and functionality may utilize the cache map 1102 to locate data within the higher-latency storage tier and/or the lower-latency storage tier.

In another example, a data structure, such as a reverse map, may be used to map locations within the lower-latency storage tier to locations within the higher-latency storage tier. In this way, cached data within the lower-latency storage tier may be traced back to data within the higher-latency storage tier from which the cached data originated. For example, if cached data within the lower-latency storage tier becomes "cold" (e.g., has been infrequently accessed), then it may be advantageous to evict the "cold" cached data from the lower-latency storage tier to the higher-latency storage tier. Accordingly, the reverse map may be consulted to determine whether data corresponding to the "cold" cached data that is to be evicted to the higher-latency storage tier is (already/still) stored within the higher-latency storage tier.

Figure 12:
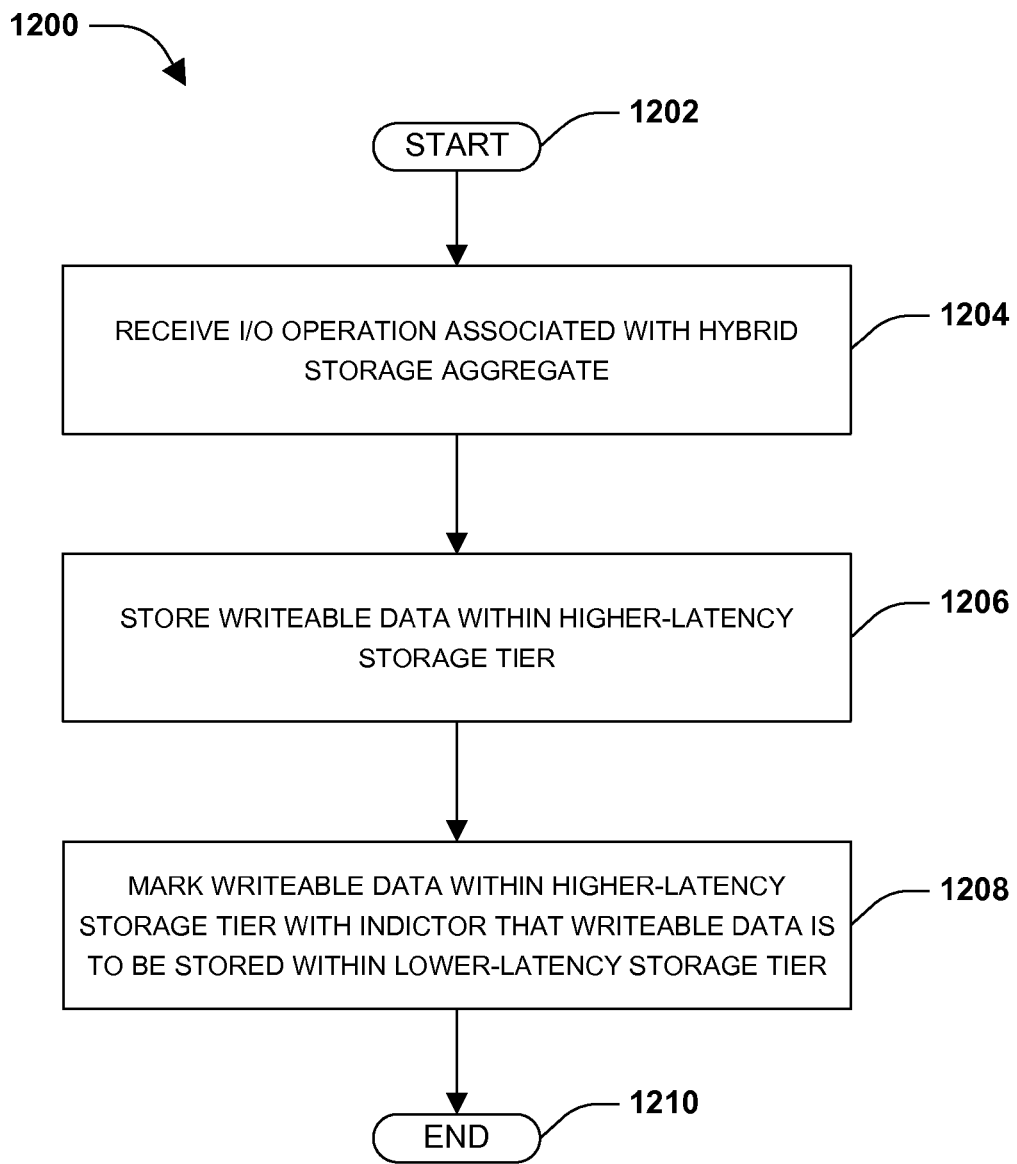
FIG. 12 is a flow chart illustrating an exemplary method of storing data within a hybrid storage aggregate.

One embodiment of storing data within a hybrid storage aggregate is illustrated by exemplary method 1200 in FIG. 12. At 1202, the method starts. At 1204, an I/O operation associated with the hybrid storage aggregate may be received. The I/O operation may comprise writeable data. At 1206, the writeable data may be stored within a higher-latency storage tier of the hybrid storage aggregate. At 1208, the writeable data stored within the higher-latency storage tier may be marked with an indicator specifying that the writeable data is to be cached within a lower-latency storage tier of the hybrid storage aggregate. For example, the indicator may indicate that the writeable data is to be cached within the lower-latency storage tier upon being read from the higher-latency storage tier (e.g., read after write caching). The writeable data may be marked with the indicator based upon determining that the writeable data is to be written non-sequentially and/or based upon predicting that the writeable data will be accessed above a threshold frequency. In another example, instead of marking the writeable data with the indicator, the writeable data may be stored within both the higher-latency storage tier and the lower-latency storage tier. At 1210, the method ends.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 13:
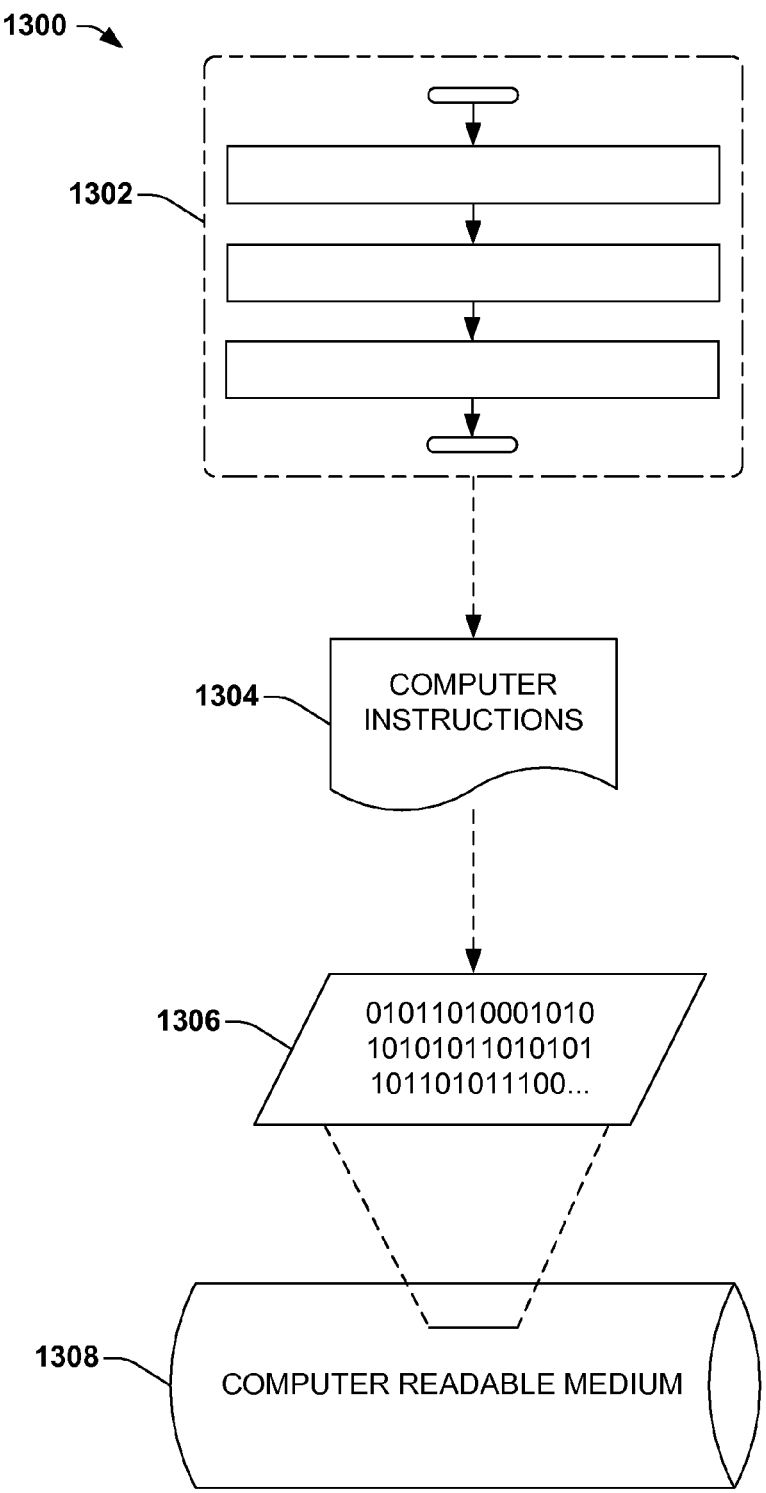
FIG. 13 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 13, where the implementation 1300 comprises a computer-readable medium 1308 (e.g., a CD-R, DVD-R, platter of a hard disk drive, flash drive, etc.), on which is encoded computer-readable data 1306. This computer-readable data 1306 in turn comprises a set of computer instructions 1304 configured to operate according to the principles set forth herein. In one such embodiment, the processor-executable instructions 1304 may be configured to perform a method 1302, such as at least some of the method 300 of FIG. 3, at least some of method 400 of FIG. 4, and/or at least some of method 12 of FIG. 12, for example, and/or at least some of a system, such as at least some of the system 700 of FIG. 7, at least some of system 800 of FIG. 8, at least some of system 900 of FIG. 9, and/or at least some of system 1000 of FIG. 10, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for storing data within a hybrid storage aggregate, comprising:
   receiving an I/O operation associated with a hybrid storage aggregate comprising a lower-latency storage tier and a higher-latency storage tier;
   evaluating the I/O operation to determine that the I/O operation comprises requested data corresponding to at least one of a non-sequential read operation for data within the higher-latency storage tier, data designated for low latency access, or a read operation for data predicted for frequent access;
   retrieving the requested data from the higher-latency storage tier;
   storing a copy of the requested data as copied data within the lower-latency storage tier;
   maintaining a temperature metric for the copied data; and
   if the temperature metric falls below a threshold, evicting the copied data from the lower-latency storage tier.

2. The method of claim 1, the lower-latency storage tier comprising electronic storage media and the higher-latency storage tier comprising magnetic storage media.

3. The method of claim 2, the electronic storage media comprising one or more solid state devices and the magnetic storage media comprising one or more hard disk drives.

4. The method of claim 1, the higher-latency storage tier comprising a first RAID group comprising magnetic storage media and the lower-latency storage tier comprising a second RAID group comprising electronic storage media.

5. The method of claim 4, the second RAID group non-disruptively added to the hybrid storage aggregate without interrupting access to the first RAID group.

6. The method of claim 1, comprising integrating one or more RAID groups into a file system of the hybrid storage aggregate, the one or more RAID groups associated with at least one of the higher-latency storage tier or the lower-latency storage tier.

7. The method of claim 1, the evaluating the I/O operation comprising:
   determining that the requested data is to be accessed at random block offsets.

8. The method of claim 1, the storing a copy comprising:
   making an entry into a cache map indicating that the copied data was stored within the lower-latency storage tier, the cache map comprising entries associated with respective copied data copied from the higher-latency storage tier to the lower-latency storage tier.

9. The method of claim 8, the cache map integrated into a file system of the hybrid storage aggregate.

10. The method of claim 1, the evicting comprising:
    removing an entry within a cache map associated with the copied data.

11. The method of claim 1, the lower-latency storage tier maintained as a cache.

12. The method of claim 1, the retrieving the requested data comprising;
    if a cached copy of the requested data is stored within the lower-latency storage tier, then retrieving the cached copy as the requested data, otherwise retrieving the requested data from the higher-latency storage tier.

13. The method of claim 1, the evaluating the I/O operation comprising:
    determining that the I/O operation comprises a non-sequential hot read operation based upon determining that the requested data is accessed above a threshold frequency.

14. The method of claim 1, the storing a copy comprising:
    maintaining the requested data within the higher-latency storage tier.

15. The method of claim 1, comprising:
    storing metadata associated with the hybrid storage aggregate within the lower-latency storage tier.

16. A system for storing data within a hybrid storage aggregate, comprising:
    a read caching component configured to:
       receive an I/O operation associated with a hybrid storage aggregate comprising a lower-latency storage tier and a higher-latency storage tier;
       evaluate the I/O operation to determine that the I/O operation comprises requested data corresponding to a non-sequential read operation for data within the higher-latency storage tier;
       retrieve the requested data from the higher-latency storage tier;
       store a copy of the requested data as copied data within the lower-latency storage tier;
       maintain a temperature metric for the copied data; and
       if the temperature metric falls below a threshold, evict the copied data from the lower-latency storage tier.

17. The system of claim 16, the lower-latency storage tier comprising electronic storage media and the higher-latency storage tier comprising magnetic storage media.

18. The system of claim 17, the hybrid storage aggregate comprising at least one first RAID group comprising at least some of the magnetic storage media and at least one second RAID group comprising at least some of the electronic storage media.

19. The system of claim 16, the read caching component configured to:
    make an entry into a cache map indicating that the copied data was stored within the lower-latency storage tier, the cache map comprising entries associated with respective copied data copied from the higher-latency storage tier to the lower-latency storage tier.

20. The system of claim 19, the cache map integrated into a file system of the hybrid storage aggregate.

21. The system of claim 16, the read caching component configured to at least one of:
    determine that the requested data is to be accessed non-sequentially; or
    determine that the requested data is accessed above a threshold frequency.

22. The system of claim 16, the read caching component comprised within a node configured to manage storage of data within the hybrid storage aggregate.

23. The system of claim 16, the read caching component configured to:
    remove an entry within a cache map associated with the copied data responsive to evicting the copied data.

* * * * *